United States Patent [19]

Minowa et al.

[11] 4,183,971

[45] Jan. 15, 1980

[54] HARD BUTTER

[75] Inventors: Seigi Minowa; Toshiro Tanaka; Nozomi Yasuda, all of Tokyo, Japan

[73] Assignee: Asahi Denka Kogyo K.K., Tokyo, Japan

[21] Appl. No.: 841,399

[22] Filed: Oct. 12, 1977

[30] Foreign Application Priority Data

Oct. 15, 1976 [JP] Japan .................. 51-123551

[51] Int. Cl.² ............................................. A23D 5/00
[52] U.S. Cl. ..................................... 426/607; 426/611
[58] Field of Search .............. 426/306, 313, 601, 607, 426/611; 260/409

[56] References Cited

U.S. PATENT DOCUMENTS 3,199,984  8/1965  Jensen et al. ................. 260/409

FOREIGN PATENT DOCUMENTS 1119097  4/1957  Fed. Rep. of Germany ........... 426/607

OTHER PUBLICATIONS

Feuge, R. O., "Production of Speciality Edible Fats", JAOCS, vol. 37, No. 10, 1960, pp. 527–532.

*Primary Examiner*—Robert A. Yoncoskie
*Attorney, Agent, or Firm*—Blanchard, Flynn, Thiel, Boutell & Tanis

[57] ABSTRACT

A hard butter having an iodine value of 52 to 75, a melting point of 30° to 40° C. and a trans-isomer content of at least 40% by weight based on the total weight of combined fatty acids and consisting essentially of (a) 50 to 100% by weight of a first hardened oil obtained by hydrogenating with isomerization a rice-bran oil having an iodine value of 97 to 108, a $C_{16}$ saturated acid content of 15 to 22% by weight based on the total weight of combined fatty acids and 1.0 to 4.0% by weight, based on the rice bran oil, of higher alcohol fatty acid esters of which the combined higher alcohols are unsaponifiable and/or a fraction obtained by fractionation of the first hardened oil and (b) 50 to 0% by weight of a second hardened oil obtained by hydrogenating with isomerization a vegetable oil substantially free of trisaturated glycerides and having $C_{16}$ saturated fatty acid content of 12 to 30% by weight and a $C_{18}$ di-unsaturated acid content of 30 to 55% by weight based on the total weight of combined fatty acids and/or a fraction obtained by fractionation of the second hardened oil.

5 Claims, 2 Drawing Figures

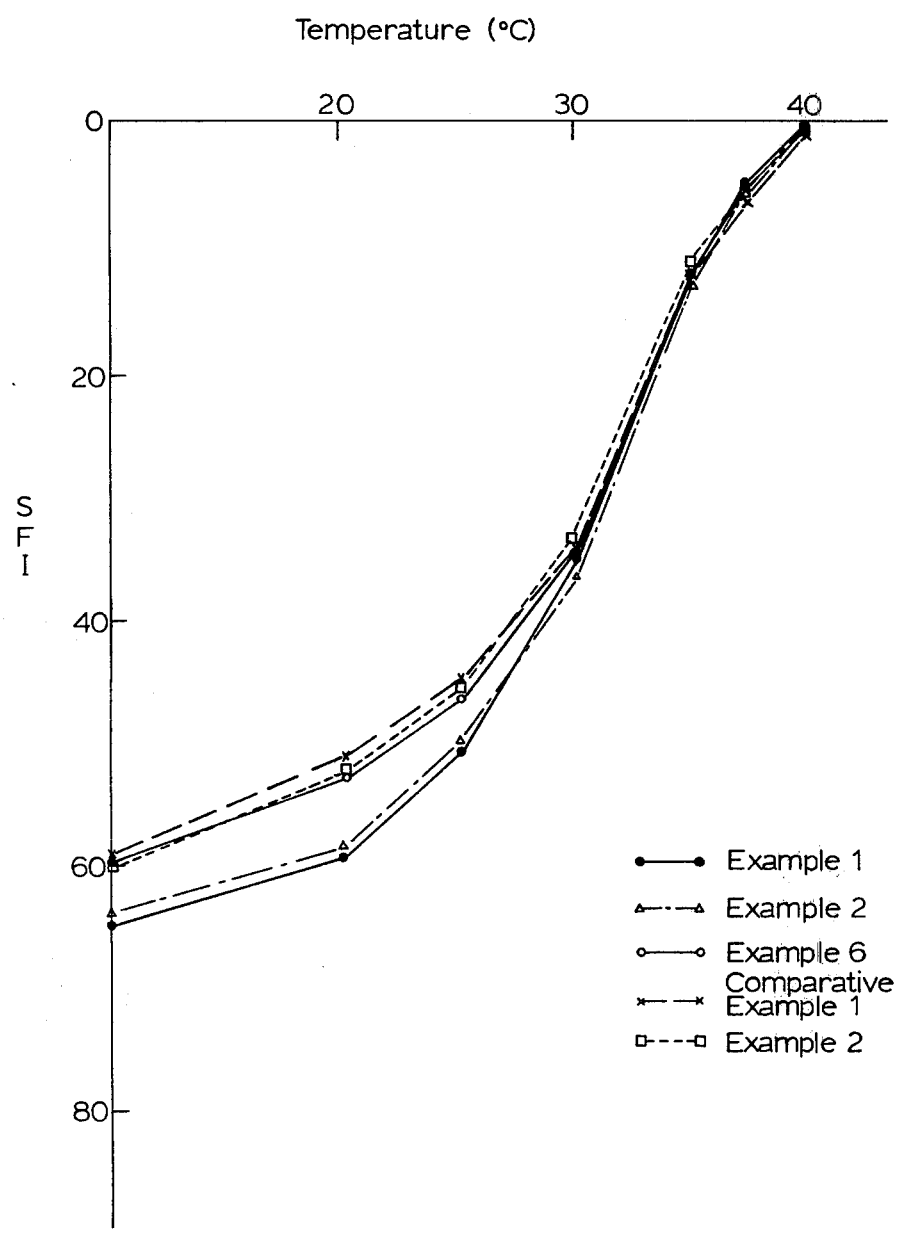

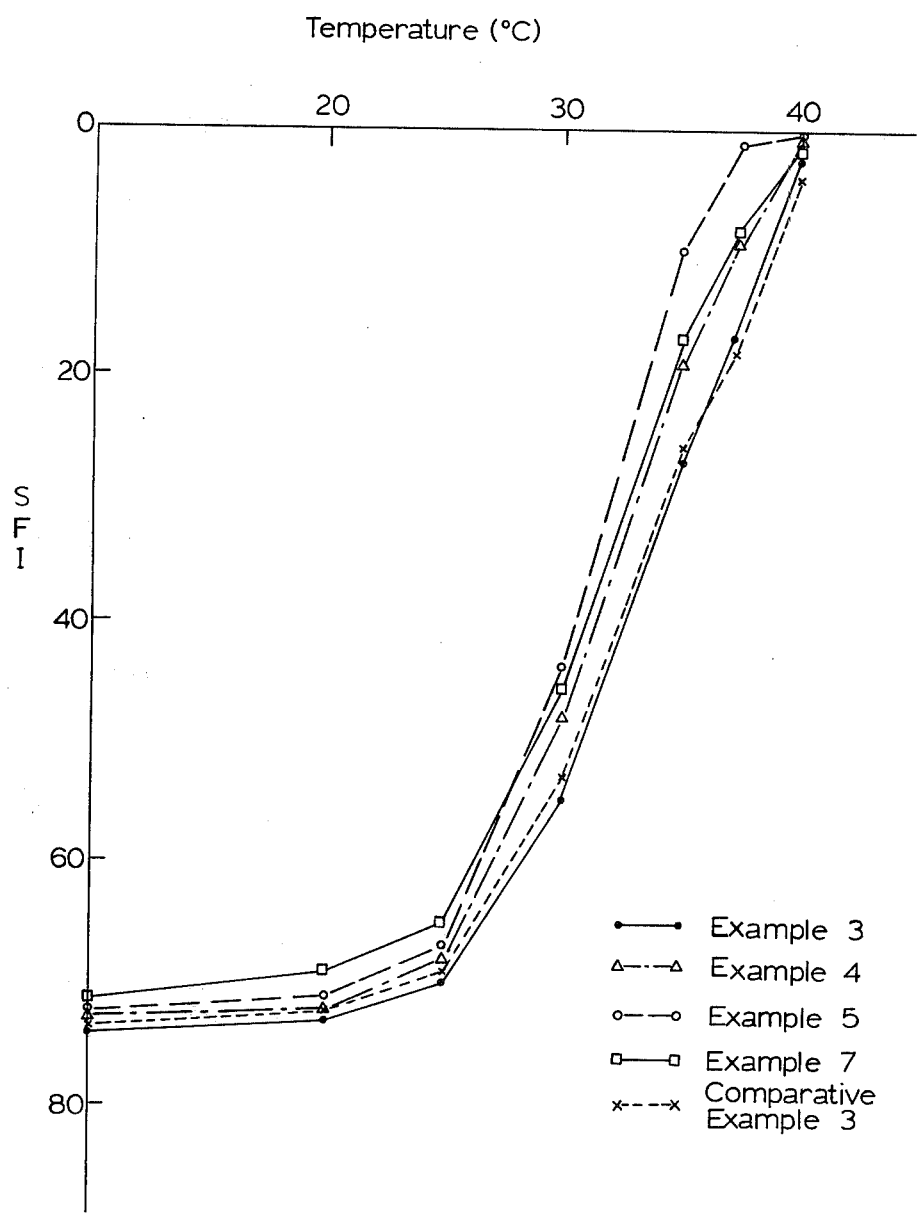

HARD BUTTER

BACKGROUND OF INVENTION

1. Field of Invention

The present invention relates to a hard butter prepared by using vegetable oils or fats as the raw materials. More particularly, the present invention relates to a hard butter containing a selective hydrogenation-isomerization product of a rice bran oil having an iodine value of 97–108.

2. Description of Prior Arts

As a conventional process for preparing a hard butter by hydrogenating a vegetable oil, there is a process disclosed in the specification of U.S. Pat. No. 3,199,984. Moreover, the specification of British Pat. No. 1,214,321 discloses a process for preparing a hard butter by hydrogenating vegetable oils or fats and fractionating the resulting hydrogenation products. However, a conventional hard butter obtained by merely hydrogenating a vegetable oil or fat is defective in the point that it lacks the desired sharp melting property. The hard butter obtained by hydrogenating a vegetable oil or fat and fractionating the resulting hydrogenation product is insufficient in its compatibility with cocoa butter. Therefore, it causes a remarkable decrease of the melting point of chocolate, which causes insufficient hardness and insufficient heat resistance of the chocolate, and it often causes fatblooming of the chocolate depending on the starting oils and fats.

SUMMARY OF INVENTION

We have performed research with a view to overcoming the foregoing defects of hard butters prepared according to conventional processes and found that a hard butter prepared from a rice bran oil having an iodine value of 97–108, a $C_{16}$ saturated acid content of 15–22% by weight based on the total weight of the combined fatty acids and containing 1.0 to 4.0% by weight, based on the rice bran oil, of higher alcohol fatty acid esters (hereinafter referred to as wax parts) of which the combined alcohols are unsaponifiable matters, has good compatibility with cocoa butter and excellent resistance to fat-blooming. The principal components of the wax parts of the unsaponifiable matters in a rice bran oil are esters of higher alcohols such as myricyl alcohol, ceryl alcohol and isoceryl alcohol and fatty acids such as cerotic acid, lignoceric acid and isocerotic acid. We have found that they have an effect of stiffening the chocolate when they are contained in the chocolate. In addition, we have also found that the $C_{16}$ saturated acid content in the combined fatty acids of rice bran oil has important effects on the stiffness, heat resistance and the compatibility with cocoa butter of the chocolate. Therefore, the $C_{16}$ saturated fatty acid must be contained in a suitable amount in the hard butter. We have found that a rice bran oil having an iodine value of 97–108, $C_{16}$ saturated acid content of 15–22% by weight based on the total of the combined fatty acids and a wax parts content of 1–4% is effective as a raw material for preparing hard butter to bring the above-mentioned effects of the wax parts and $C_{16}$ saturated content into the properties of the hard butter.

The hard butter of the present invention has an iodine value of 52 to 75, a melting point of 30° C. to 40° C. and a trans-isomer content of at least 40% by weight based on the total weight of combined fatty acids and it consists essentially of (a) 50 to 100% by weight of a first hardened oil obtained by hydrogenating with isomerization a rice-bran oil having an iodine value of 97 to 108, $C_{16}$ saturated acid content of 15 to 22% by weight based on the total weight of combined fatty acids and 1.0 to 4.0% by weight, based on the rice bran oil, of higher alcohol fatty acid esters of which the higher alcohols are unsaponifiable matters and/or a fraction obtained by fractionating said first hardened oil, and 50 to 0% by weight of a second hardened oil obtained by hydrogenating with isomerization a vegetable oil or fat substantially free of tri-saturated glycerides and having a $C_{16}$ saturated fatty acid content of 12 to 30% by weight and a $C_{18}$ di-unsaturated acid content of 30 to 55% by weight based on the total weight of combined fatty acids and/or a fraction obtained by fractionating said second hardened oil.

The higher alcohol fatty acid ester contained in the hardened oil (a) preferably composed of a $C_{24}$–$C_{30}$ higher fatty acid and a $C_{26}$–$C_{32}$ higher alcohol.

The hard butter of this invention has a trans isomer content of at least 40% by weight based on the total weight of combined fatty acids, preferably from 40% to 70% by weight.

The hard butter of the present invention consisting of the above-mentioned component (a) alone has excellent properties, but the hard butter of the present invention consisting of the above-mentioned components (a) and (b) is superior in the sharp melting property, compatibility with cocoa butter, fat-blooming resistance, stiffness and heat resistance. When the hard butter of the prent invention consists of the components (a) and (b), the weight ratio of (a) to (b) is preferably 100:0 to 50:50, more preferably 80:20 to 60:40.

The hard butter of the present invention can be prepared by various methods. For example, it can be prepared by (1) hydrogenating with isomerization the specified rice bran oil, (2) blending a first hardened oil obtained by hydrogenation with isomerization the specified rice bran oil and/or a fraction obtained by fractionating the first hardened oil, with a second hardened oil obtained by hydrogenation with isomerization the specified vegetable oil or fat and/or a fraction obtained by fractionating the second hardened oil or (3) by blending the specified rice bran oil with the specified vegetable oil or fat and then hydrogenating with isomerization the resulting mixture or then fractionating the resulting hardened product. As the raw material of the component (b) of the hard butter of the present invention, any vegetable oil or fat having $C_{16}$ saturated fatty acid content of 12 to 30% by weight and $C_{18}$ di-unsaturated fatty acid content of 30 to 55% by weight based on the total weight of combined fatty acids and which is substantially free of tri-saturated glycerides can be used. As preferred examples of such vegetable oil or fat, there can be mentioned cotton seed oil, soybean oil and mixtures thereof. It is indispensable that the hard butter of the present invention has an iodine value of 52 to 75, a melting point of 30° C. to 40° C. and a trans-isomer content of at least 40% by weight. Therefore, hydrogenation-isomerization conditions and fractionation conditions must be chosen and adjusted so that the resulting product may have the above-mentioned ranges of iodine value and trans-isomer content.

The hydrogenation of oils or fats for obtaining the hard butter of the present invention can be performed by hydrogenating with isomerization oils or fats in the presence of a catalyst such as nickel catalysts and a poisoned nickel catalyst so that the trans fatty acid content may be at least 40% by weight. As the hydrogenation catalyst, there can be used any catalyst that has an effect on the above-mentioned hydrogenation. The amount of the catalyst is not particularly critical and may be changed appropriately. In general, it is preferred that the catalyst is used in an amount of 0.1 to 2% by weight based on the weight of the oils or fats used. Hydrogenation conditions can be chosen and determined so that isomerization may be promoted and that selective hydrogenation may be performed. For example, it is preferred to perform the hydrogenation at a temperature of 160° to 220° C. under a hydrogen pressure 0 to 3 kg/cm$^2$.

Fractionation may be performed according to, for example, a solvent fractionation method such as disclosed in the Japanese patent publication No. 39882/'74, the winterization method or the fractionation method using a surface active agent such as disclosed in the Japanese patent publication No. 9986/'56.

According to those fractionation methods, hardened oil can be fractionated into two or three fractions to obtain the higher melting point component of two fractions, or the middle melting point component of three fractions. The desired fraction mainly comprises mono-unsaturated, di-saturated glycerides and di-unsaturated mono-saturated glycerides, the unsaturated fatty acid mainly comprising $C_{18}$ unsaturated fatty acid.

In producing the hard butter of the present invention, an appropriate producing process can be chosen among the foregoing various producing processes according to the use of the hard butter, the desired production cost, the production equipment and the like. For example, when it is intended to produce a high-grade product having a very shapr melting property, it is preferred to produce the hard butter consisting of the fractions obtained by fractionating the hardened oils as both of the components (a) and (b), and when it is intended to produce a cheap hard butter, it is preferred to produce the hard butter consisting of the hardened oils obtained by hydrogenating with isomerization oils or fats as both of the components (a) and (b).

It is preferred that the hard butter of the present invention has an iodine value of 52 to 75, a melting point of 30° to 40° C. and a $C_{16}$ saturated fatty acid content of 10 to 30% by weight, a $C_{18}$ saturated fatty acid content of 2 to 10% by weight and a $C_{18}$ mono-unsaturated fatty acid content of 55 to 75% by weight based on the total weight of combined fatty acids. Therefore, it is desirable to choose the weight ratio of (a) to (b) and suitably control the hydrogenation conditions to obtain the foregoing, preferred hard butter.

The hard butter of the present invention is cheap and has an excellent melting property, a good compatibility with cacao butter and a good quality.

BRIEF DESCRIPTION OF THE DRAWINGS

FIGS. 1 and 2 are SFI (solid fat index) curves of the hard butters prepared in the foregoing examples and comparative examples.

EXAMPLE 1

A mixture of 65% by weight of rice bran oil having an iodine value of 105.2, $C_{16}$ saturated fatty acid content of 16.1% by weight based on the total weight of combined fatty acids and containing 2% by weight, based on the rice bran oil, of higher alcohol fatty acid esters of which the higher alcohols are unsaponifiable matters and 35% by weight of cotton seed oil having an iodine value of 115.4, $C_{16}$ saturated fatty acid content of 17.6% by weight and $C_{18}$ di-unsaturated fatty acid content of 50.7% by weight based on the total weight of combined fatty acids was subjected to selective hydrogenation-isomerization in the presence of 0.5% by weight of the spent nickel catalyst, which had been used for hardening fish oil, at a temperature of 200° to 210° C. under a hydrogen pressure of 0.2 to 2.0 kg/cm$^2$ to obtain a hardened oil having an iodine value of 67.1, unsaponifiable matters content of 3.0% by weight, a trans-isomer content of 54.6% by weight and a melting point of 37.2° C. This hardened oil has a solid fat index curve (hereinafter referred to as "SFI curve") as shown in FIG. 1, an excellent melting property and a good compatibility with cocoa butter in the compatibility test described hereinafter. The hardened oil has a $C_{16}$ saturated fatty acid content of 16.7% by weight, a $C_{18}$ saturated fatty acid content of 5.3% by weight and a $C_{18}$ mono-unsaturated fatty acid content of 73.6% by weight based on the combined fatty acids.

EXAMPLE 2

60% by weight of a hardened oil obtained from rice bran oil having an iodine value of 103.5, , a $C_{16}$ saturated fatty acid content of 18.2% and 3% by weight, based on the rice bran oil, of higher alcohol fatty acid esters of which the combined higher alcohols are the unsaponifiable matters, which was obtained by selectively hydrogenating with isomerization in presence of 0.5% by weight of sulfur-poisoned nickel catalyst (having a sulfur content of 3% by weight based on nickel) at a temperature of 200°-210° C. at atmospheric pressure, was blended with 40% by weight of a hardened oil obtained by selectively hydrogenating with isomerization the same cotton seed oil as used in Example 1 under the same conditions as described above to obtain a hard butter having an iodine value of 66.7, a trans-isomer content of 54.3% by weight and a melting point of 37.3° C. This hard butter had a $C_{16}$ saturated fatty acid content of 18.8% by weight, a $C_{18}$ saturated fatty acid ccontent of 5.0% by weight and a $C_{18}$ mono-unsaturated fatty acid content of 72.6% by weight based on the total weight of combined fatty acids. This hard butter was found to have an SFI curve as shown in FIG. 1, an excellent melting property and it exhibited a good compatibility with cocoa butter in the compatibility test described hereinafter.

EXAMPLE 3

A mixture of 80% by weight of the same rice bran oil as used in Example 2 and 20% by weight of soybean oil having an iodine value of 129.5 and a $C_{16}$ saturated fatty acid content of 12.3%, a $C_{18}$ di-unsaturated fatty acid content of 50.1% by weight based on the total combined fatty acids and substantially no tri-saturated glycerides was subjected to selective hydrogenation-isomerization in the presence of 0.3% by weight of the same spent nickel catalyst as used in Example 1 at a temperature of 200°-210° C. under a hydrogen pressure of 1.0 kg/cm$^2$ to obtain a hardened oil having an iodine value of 70.7, a trans-isomer content of 56.5% by weight and a melting point of 33.1° C. To 1 part by weight of the so obtained hardened oil was added 6 parts by weight of acetone and the resulting mixture was cooled to 1° C. to effect fractional crystallization. The filtrate was separated and the solvent was removed from the residual crystal portion to obtain a fraction having an iodine value of 62.6 and melting point of 37.6° C. as hard butter.

The hard butter so obtained had a $C_{16}$ saturated fatty acid content of 17.3% by weight, a $C_{18}$ saturated fatty acid content of 8.4% by weight and a $C_{18}$ mono-unsaturated fatty acid content of 69.8% by weight based on the total combined fatty acids and it was found to have an SFI curve as shown in FIG. 2, an excellent melting property and a good compatibility with cocoa butter in the compatibility test described hereinafter.

EXAMPLE 4

The same rich bran oil as used in Example 2 was selectively hydrogenated with isomerization in the presence of 0.5% by weight of the same catalyst as used in Example 2 at a temperature of 200°–210° C. under atmospheric pressure to obtain a hardened oil having an iodine value of 63.3, a trans-isomer content of 52.7% by weight and a melting point of 39.5° C. Separately, cotton seed oil having an iodine value of 110.3, a $C_{16}$ saturated fatty acid content of 19.0% by weight, a $C_{18}$ saturated fatty acid content of 1.5% by weight and a $C_{18}$ di-unsaturated fatty acid content of 50.3% by weight based on the total combined fatty acids and substantially no tri-unsaturated glycerides was subjected to selective hydrogenation-isomerization in the presence of 0.3% by weight of the same catalyst as used in Example 2 at a temperature of 200°–210° C. under a hydrogen pressure of 1.5 kg/cm² to obtain a hardened oil having an iodine value of 63.2 and a melting point of 38.5° C. The hardened rice bran oil was mixed with the hardened cotton seed oil at a mixing ratio of 75/25. To 1 part by weight of the so obtained mixture was added 3 parts by weight of acetone and the resulting mixture was cooled to 22° C. to effect crystallization. The filtrate portion was recovered and then cooled to 1° C. The filtrate portion was separated and then the solvent was removed from the residual crystal portion to obtain a fraction having an iodine value of 58.0 and a melting point of 36.1° C. as hard butter. The hard butter so obtained was found to have a $C_{16}$ saturated fatty acid content of 22.4% by weight, a $C_{18}$ saturated fatty acid content of 8.8% by weight and a $C_{18}$ mono-unsaturated fatty acid content of 66.3% by weight based on the total combined fatty acids and an SFI curve as shown in FIG. 2, an excellent melting property and a good compatibility with cocoa butter in the compatibility test described hereinafter.

EXAMPLE 5

The same rice bran oil as used in Example 2 was selectively hydrogenated with isomerization in the presence of 0.3% by weight of the same catalyst as used in Example 1 at a temperature of 200°–210° C. under a hydrogen pressure of 1.0 kg/cm² to obtain a hardened oil having an iodine value of 68.7, a trans-isomer content of 52.5% by weight and a melting point of 33.3° C. To 1 part by weight of the so obtained hardened oil was added 3 parts by weight of acetone and then cooled to 20° C. to effect crystallization. The filtrate portion was separated and then cooled to 0° C. to effect crystallization and the solvent was removed from the residual crystal portion to obtain a fraction having an iodine value of 64.5 and a melting point of 34.6° C. Separately, the same cotton seed oil as used in Example 1 was selectively hydrogenated with isomerization in the presence of 0.3% by weight of the same catalyst as used in Example 2 at a temperature of 200°–210° C. under a hydrogen pressure of 1.5 kg/cm² and the hardened oil was fractionated under the same conditions as described above to obtain a fraction having an iodine value of 68.8 and a melting point of 34.7° C. The fraction obtained from the hardened rice bran oil was mixed with the fraction obtained from the hardened cotton seed oil at a mixing weight ratio of 55/45 to obtain a hard butter having an iodine value of 66.5 and a melting point of 34.5° C.

The hard butter so obtained was found to have a $C_{16}$ saturated fatty acid content of 19.2% by weight, a $C_{18}$ saturated fatty acid content of 6.9% by weight and a $C_{18}$ mono-unsaturated fatty acid content of 70.8% by weight based on the total combined fatty acids and an SFI curve as shown in FIG. 2, an excellent melting property and a good compatibility with cocoa butter in the compatibility test described hereinafter.

EXAMPLE 6

The same rice bran oil as used in Example 2 was subjected to selective hydrogenation-isomerization in the presence of 0.5% by weight of the same catalyst as used in Example 2 at a temperature of 200°–210° C. under an atmospheric pressure to obtain a hardened oil having an iodine value of 67.5, a trans-isomer content of 52.2% by weight and a melting point of 37.3° C. as hard butter.

The hard butter so obtained was found to have a $C_{16}$ saturated fatty acid content of 19.1% by weight, a $C_{18}$ saturated fatty acid content of 9.4% by weight and a $C_{18}$ mono-unsaturated fatty acid content of 68.2% by weight bassed on the total combined fatty acids and an SFI curve as shown in FIG. 1.

EXAMPLE 7

The same rice bran oil as used in Example 2 was selectively hydrogenated with isomerization in the presence of 0.3% by weight of the same catalyst as used in Example 1 at a temperature of 200°–210° C. under a hydrogen pressure of 1.0 kg/cm² to obtain a hardened oil having an iodine value of 70.1, a trans-isomer content of 53.4% by weight and a melting point of 33.0° C. The hardened oil was fractionated under the same conditions as described in Example 3 to obtain a fraction having an iodine value of 61.9 and a melting point of 37.8° C. as hard butter. The so obtained hard butter was found to have a $C_{16}$ saturated fatty acid content of 20.9% by weight, a $C_{18}$ saturated fatty acid content of 7.9% by weight and a $C_{18}$ mono-unsaturated fatty acid content of 66.4% by weight based on the total combined fatty acids and an SFI curve as shown in FIG. 2.

COMPARATIVE EXAMPLE 1

Rapeseed oil having an iodine value of 116.2 was hydrogenated selectively with isomerization by using the same spent nickel catalyst as used in Example 1 under the same conditions as described in Example 1 to obtain a hardened oil having an iodine value of 66.8, a trans-isomer content of 53.7% by weight, an unsaponifiable matter content of 0.5% by weight and a melting point of 37.1° C. as hard butter. The hard butter so obtained was found to have an SFI curve as shown in FIG. 1. In the compatibility test of this hard butter, the results as shown in the following Table were obtained.

COMPARATIVE EXAMPLE 2

60% by weight of a hardened oil obtained from cotton seed oil having an iodine value of 115.4 by using the same catalyst as used in Example 2 under the same conditions as described in Example 2 was mixed with 40% by weight of a hardened oil obtained from palm olein having an iodine value of 62.0 by selective hydrogenation-isomerization under the same conditions as described in Example 1 to obtain a mixture having an iodine value of 63.7 and a melting point of 37.6° C. as hard butter. The hard butter so obtained was found to have an SFI curve as shown in FIG. 1. The result of the compatibility test of this hard butter is shown in the following Example for producing chocolate.

COMPARATIVE EXAMPLE 3

Soybean oil having an iodine value of 129.5 was selectively hydrogenated with isomerization in the presence of the same catalyst as used in Example 3 under the same conditions as described in Example 3 to obtain a hardened oil having an iodine value of 78.6, a trans-isomer content of 61.3% by weight and a melting point of 32.8° C.

The hardened oil was then fractionated under the same conditions as described in Example 3 to obtain a fraction having an iodine value of 65.6 and a melting point of 37.7° C. as hard butter.

The hard butter so obtained was found to have an SFI curve as shown in FIG. 2. The result of the compatibility test of this hard butter is shown in the following Example for producing chocolate.

EXAMPLE FOR PRODUCING CHOCOLATE

In order to test the compatibility of each hard butter obtained in Examples 1 to 7 and Comparative Examples 1 to 3 with cacao butter, chocolates were prepared by using these hard butters and then the chocolates were compared with respect to their hardness and anti-blooming property.

A chocolate base comprising 50 parts of powdered sugar, 10 parts of cacao mass, 10 parts of cacao cake having an oil content of 12 to 14% by weight, 30 parts of hard butter and 0.3 parts of lecithin was prepared and moulded without a tempering process. The demoulded chocolate was allowed to stand at 28° C. for 4 hours and the hardness (penetration) as measured by a cone penetrometer. The penetration value of each chocolate is shown in Table 1. The moulded chocolates were allowed to stand in a thermohydrostat at 20° C. and the anti-blooming property was examined. The results of the anti-blooming test are shown in Table 1.

Table 1

| | penetration value (mm/10) | anti blooming property * (allowed to stand at 20 degrees) | | | | |
|---|---|---|---|---|---|---|
| | | 0 | 10 days | 20 days | 40 days | 60 days | 80 days |
| Hard butter of Example 1 | 35 | — | — | — | ± | ± | ± |
| Hard butter of Example 2 | 36 | — | — | — | — | ± | ± |
| Hard butter of Example 3 | 22 | — | — | — | ± | ± | ± |
| Hard butter of Example 4 | 25 | — | — | — | — | ± | ± |
| Hard butter of Example 5 | 31 | — | — | — | — | ± | ± |
| Hard butter of Example 6 | 36 | — | — | — | — | ± | ± |
| Hard butter of Example 7 | 27 | — | — | — | — | ± | ± |
| Hard butter of Comparative Example 1 | 50 | — | — | ± | ± | ± | ± |
| Hard butter of Comparative Example 2 | 47 | — | ± | ± | ± | + | |
| Hard butter of Comparative Example 3 | 38 | — | ± | ± | ± | + | |

[Note]
* level of effect
− good gloss
± somewhat bad gloss
+ blooming observed

As shown in Table 1, the hard butters of Examples 1 to 7 are harder (and have a sharp SFI curve) and exhibit a better anti-blooming property and a better compatibility with cacao butter than the hard butters of Comparative Examples 1 to 3.

FIG. 1 shows the SFI curves of the hard butters which are prepared by only hydrogenation-isomerization. As shown in FIG. 1, the hard butter of Example 6 has almost same SFI curve as the hard butters of Comparative Examples 1 and 2 and the hard butter of Example 1 and 2 has more sharp SFI curve than them.

FIG. 2 shows the SFI curves of the hard butters which are prepared by hydrogenation-isomerization and subsequent fractionation. As shown in FIG. 2, the hard butters of Example 3, 4 and 5 have a more sharp SFI curve than the hard butter of Example 7 and the hard butter obtained in Example 3 is harder and has a better compatibility than the hard butter of Example 7 which is prepared by using almost same conditions of hydrogenation-isomerization and subsequent fractionation as Example 3.

What we claim is:

1. A hard butter having an iodine value of 52 to 75, a melting point of 30° to 40° C., a $C_{16}$ saturated fatty acid content of 10 to 30% by weight, a $C_{18}$ saturated fatty acid content of 2 to 10% by weight, a $C_{18}$ mono-unsaturated fatty acid content of 55 to 75% by weight and a trans-isomer content of 40 to 70% by weight based on the total weight of combined fatty acids, said hard butter consisting essentially of (a) 50 to 100% by weight of a first hardened oil obtained by hydrogenating with isomerization a rice bran oil having an iodine value of 97 to 108 and a $C_{16}$ saturated acid content of 15 to 22% by weight based on the total weight of combined fatty acids and containing 1.0 to 4.0% by weight, based on the rice bran oil, of higher alcohol fatty acid esters of which the higher alcohols are unsaponifiable matters of said rice bran oil, a fraction obtained by fractionation of the first hardened oil, or mixture thereof, and (b) 50 to 0% by weight of a second hardened oil obtained by hydrogenating with isomerization a vegetable oil substantially free of tri-saturated glycerides and having a $C_{16}$ saturated fatty acid content of 12 to 30% by weight and a $C_{18}$ diunsaturated acid content of 30 to 55% by weight based on the total weight of combined fatty acids, a fraction obtained by fractionation of the second hardened oil, or mixture thereof.

2. A hard butter according to claim 1 wherein said hard butter consists essentially of said first hardened oil obtained by hydrogenating with isomerization of the rice bran oil or the fraction obtained by fractionation of said first hardened oil.

3. A hard butter according to claim 1 wherein said hard butter consists essentially of (a) 60 to 80% by weight of said first hardened oil obtained by hydrogenating with isomerization of the rice bran oil or the fraction obtained by fractionation of said first hardened oil and (b) 40 to 20% by weight of said second hardened oil obtained by hydrogenating with isomerization of the vegetable oil or the fraction obtained by fractionation of the second hardened oil.

4. A hard butter according to claim 1 in which said higher alcohol fatty acid ester is composed of $C_{24}$ to $C_{30}$ fatty acid and $C_{26}$–$C_{32}$ higher alcohol.

5. A hard butter according to claim 1 in which said vegetable oil is cottonseed oil, soybean oil or mixture thereof.

* * * * *